(12) United States Patent
Männle et al.

(10) Patent No.: US 8,183,315 B2
(45) Date of Patent: May 22, 2012

(54) POLYMER COMPOSITION

(75) Inventors: Ferdinand Männle, Oslo (NO); Jest Beylich, Oslo (NO); Roger Hauge, Gursken (NO); Christian Simon, Oslo (NO); Emil Arne Kleppe, Gursken (NO); Aage Gellein Larsen, Oslo (NO); Kaare Roger Röseth, Gursken (NO)

(73) Assignee: Nor-X-Industry AS, Gursken (NO)

( * ) Notice: Subject to any disclaimer, the term of this patent is extended or adjusted under 35 U.S.C. 154(b) by 554 days.

(21) Appl. No.: 11/578,078

(22) PCT Filed: Apr. 18, 2005

(86) PCT No.: PCT/NO2005/000127
§ 371 (c)(1),
(2), (4) Date: Jun. 29, 2007

(87) PCT Pub. No.: WO2005/100469
PCT Pub. Date: Oct. 27, 2005

(65) Prior Publication Data
US 2007/0290176 A1    Dec. 20, 2007

(30) Foreign Application Priority Data
Apr. 16, 2004  (NO) .................................. 20041556

(51) Int. Cl.
C08K 5/04    (2006.01)

(52) U.S. Cl. ................ 524/394; 524/398; 524/500
(58) Field of Classification Search ............... 524/394, 524/500, 398
See application file for complete search history.

(56) References Cited

U.S. PATENT DOCUMENTS

| 3,840,512 | A | * | 10/1974 | Brackman | ........................ 524/287 |
| 4,686,125 | A | * | 8/1987 | Johnston et al. | ............... 383/116 |
| 5,081,170 | A | * | 1/1992 | Yagi et al. | ......................... 524/99 |
| 5,525,757 | A | * | 6/1996 | O'Brien | .................... 174/121 A |

* cited by examiner

Primary Examiner — Edward Cain
(74) Attorney, Agent, or Firm — Bracewell & Giuliani LLP

(57) ABSTRACT

Polymer composition comprising a) 10-99.99% by weight of at least one polyolefin, b) 0-50% by weight of a thermoplastic that is not a polyolefin, c) 0.005-1% by weight of per se known polymer additives, as well as an additional component chosen among d) at least one polybranched organic/inorganic hybrid polymer which has an inorganic core carrying organic branches, the core and branches forming a particulate structure, or/and e) a fat-soluble metal compound prepared by reacting a metal salt and an acidic, organic compound in a process in which a suitable oxidation agent ensures that all the metal in the end product is present in its highest stable oxidation state at standard conditions (25° C. and maximum 98% humidity).

29 Claims, No Drawings

POLYMER COMPOSITION

RELATED APPLICATION

This application claims priority to PCT application PCT/NO2005/000127, filed Apr. 18, 2005, which claimed priority to Norwegian patent application 20041556, filed Apr. 16, 2005.

The present invention concerns a polymer composition comprising at least one polyolefin and at least one component that is not a polyolefin.

According to second aspect the invention concerns adaptation of different properties of a polymer composition by suitable choice of the above mentioned components. According to a third aspect the invention concerns use of such polymer compositions.

BACKGROUND

Polymer materials are utilized in an increasing number of categories of products, such as components for cars, boats, airplanes, within the electronics industry and other advanced industry as well as in paints and other coatings, for special packaging etc. The uses of polymer materials in new categories of products are only limited by the product properties. It is thus a continuous need for development of polymer products with improved properties e.g. with respect to increased scratch resistance, improved weather resistance, increased UV resistance, increased chemical resistance and improved properties with respect to anti oxidation, anticorrosion etc.

In addition to pure polymer materials there has also been developed products based on materials that may be described as hybrids between inorganic and organic materials, which means that these materials are macro molecules that may have an inorganic core and organic branches.

Organic polymer molecules with branched structures have an enormous economical growth potential, particularly as components in new materials. So-called dendrimers are important examples of such polymer molecules with a perfectly branched structure as well as hyperbranched polymers with statistically progressive branching. Both dendrimers and hyperbranched polymers are denoted dendritic polymers. Dendritic (from Greec: "dendron"=tree) characterizes the principle of a progressive branching that is more or less perfect (G. R. Newkome, C. N. Moorefield, F. Vögtle, "Dendrimers and Dendrons: Concepts, Syntheses, Applications", Wiley-VCH, Weinheim, (2001)). Formula 1 illustrates the principle difference between linear polymers and dendritic polymers (hyperbranched polymers and dendrimers).

FORMULA 1

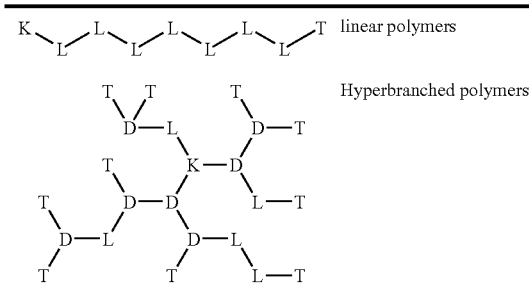

FORMULA 1-continued

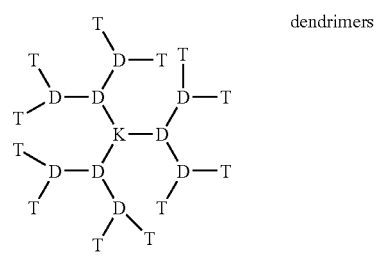

K germ (the beginning of the polymer molecule)
L linear propagation
D dendritic branching
T termination (the end of the polymer molecule)

Dendritic polymers are particularly interesting because the T units may carry functional groups and the density of available functional groups per weight or volume unit of the polymer is much higher than what is the case for linear polymers. Functional T groups may be used to impart a function in a material, like an antioxidant, a UV absorber, or a radical scavenger as described in WO publication No. 02092668.

Alternatively the T groups may be used as very efficient cross-linkers of organic materials like epoxy resins or polyurethanes or as cross-linkers for thermoplastics. Due to the high degree of cross-linking between dendritic polymers and such organic compounds the dendritic polymers are superior cross-linkers compared to conventional cross-linkers like polyamines, polyalcohols, or multifunctional acrylates. Higher degree of cross-linking of an organic material like a cross-linked thermoplastic improves properties such as chemical resistance, weather resistance and wears resistance and makes the material useful for applications at higher temperature. (Hans Zweifel (ed.), Plastics Additives Handbook, Carl Hanser Verlag, München, (2001), 725-811). The T groups may also be used to organize the dendritic polymers in a network. As component in a material the dendritic polymer thus may induce improved barrier properties. Alternatively such dendritic polymers may be used as a binder or as a component in a thermoset plastic.

Dendrimers are usually manufactured in relatively complicated and expensive synthesis comprising several steps. The process conditions must be maintained very accurately in order to achieve a perfect progressive branch structure. Their industrial applications are therefore limited.

A general way of manufacture of hyper branched polymers was early described by Flory (P. J. Flory, Principles of Polymer Chemistry, Cornell University, (1953)). The polymerization of an $AB_2$ monomer where A may react with B but where the reactions between A and A and between B and B are precluded, leads to a hyperbranched polymer.

Another way of manufacturing hyperbranched polymers involves the utilization of a reactive monomer that also carries an initiator, a so-called "inimer". One example is the base catalyzed reaction between the inimer glycidol and the germ trimethylol propane as illustrated by Formula 2.

FORMULA 2

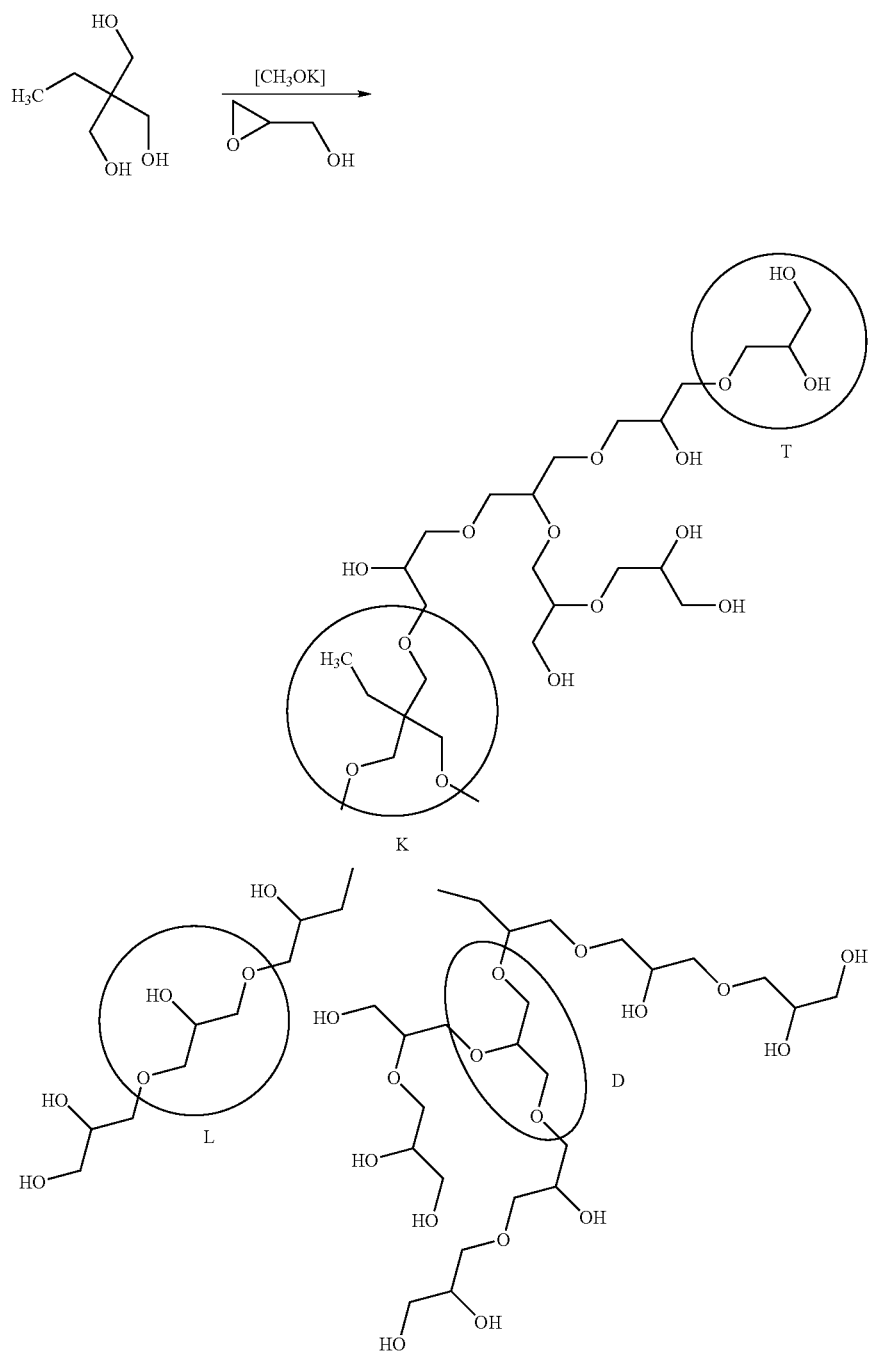

K germ (the beginning of the polymer molecule)
L linear propagation
D dendritic branching
T termination (the end of the polymer molecule)

Hyperbranched polymers made in this way have properties that are quite similar to corresponding dendrimers (A. Sunder, R. Hanselmann, H. Frey, R. Mühlhaupt; *Macromolecules*, (1998), 32, 4240). This implies a much lower viscosity than that of linear polymers with a comparable number of free available HO-groups. A characteristic feature in the manufacturing process is that the inimer glycidol must be added very slowly to the germ and in a very thin dilution.

Thus, the cost-efficiency of the process is severely reduced which is why the utility of hyperbranched polymers in industrial applications is quite limited.

It is previously known to perform certain modifications of the T groups of hyperbranched polymers. J.-P. Majoral, A.-M. Caminade and R. Kraemer, *Anales de Química Int. Ed.*, (1997), 93, 415-421 describe the functionalization of dendrimers containing phosphorus. The functionalization of the T groups can be made with identical/similar chemical groups or with different chemical groups.

FR 2761691 discusses dendrimers with functional groups at the surface that are modified through a reaction with cyclic thioesters. The reaction leads to a dendrimer surface with thiol groups that are attached to the dendrimer by amide or amine bondings. The products may be used as antioxidants. The dendrimers described are of the type polyamidoamine dendrimers (PAMAM dendrimers). PAMAM dendrimers contain tertiary amines that comparatively easy may be degraded after conversion to quaternary ammonium salts or aminoxides (A. W. Hofmann, *Justus Liehigs Ann. Chem.* (1851), 78, 253-286; A. C. Cope, E. R. Trumbull, *Org. React.* (1960), 11, 317-493; A. C. Cope, T. T. Foster, p. H. Towle, *J. Am. Chem. Soc.* (1949), 71, 3929-3935). Quaternary ammonium salts or aminoxides from amine based dendrimers can be formed when additives of amine based dendrimers are incorporated/compounded into thermoplastics with subsequent processing of the thermoplastics (e.g. film blowing, extrusion, casting). Such a degradation on one hand leads to a partial deterioration of the dendrimer core and on the other hand to formation of degradation products which may leak out and thereby reduce the surface quality of the polymer product. In addition tertiary amines may during processing of the thermoplastic form free radicals by decomposition of hydro peroxides (A. V. Tobolsky, R. B. Mesrobian, *Organic Peroxides*, (1954), Interscience Publishers, New York, p. 104-106). Dendrimers and hyperbranched polymers that contain tertiary amines thereby may induce an unintended degradation of thermoplastics during their processing, storage or use.

WO 01/48057 discusses multifunctional stabilizers against thermal oxidative degradation based on a core structure containing tertiary amines. As mentioned above this may lead to an unintended degradation of the core structure during processing, storage or use of (the) thermoplastics. The molar weight of a typical stabilizer manufactured in accordance with WO 01/48057 is 1246 g/mole.

WO 97/19987 discusses combinations of polymer additives and modified dendrimers that may be used in polymer materials. In the exemplification of WO 97/199987 the dendrimers are based on polypropyleneimine (PPI) of $3^{rd}$, $4^{th}$ and $5^{th}$ generation thereby including 16, 32, and 64 terminal amine groups. The core structure contains tertiary amines which may lead to an unintended degradation of the core structure during processing, storage or use of thermoplastics. The modification of the PPI dendrimer with a fatty acid to form a multifunctional fatty acid amide may bee conducted by means of heating in a suitable solvent. The tertiary amine groups in the core structure of the dendrimer and primary amine groups at the dendrimer surface may in presence of oxygen contribute to partial degradation of the dendrimer structure. As explained above free radicals may be formed by decomposition of hydro peroxides. Such a partial degradation is indicated by a faint brown or yellow colour of the modified PPI dendrimer, like in examples I, XI, and XII in WO 97/19987. Typical molecule weights for modified PPI dendrimers in WO 97/19987 are in the range 10 000 to 40 000 g/mole. In WO 02/092668 surface activated hyperbranched or dendritic stabilizers comprising at least one additive group and a hyperbranched or dendritic core is discussed. In the exemplification of WO 02/092668 only dendritic cores based on 2,2-bis-(hydroxymethyl)-propionic acid is used. The dendritic core and the bonding to the additive group thereby are mainly based on ester bondings, which make the stabilizer sensitive to hydrolysis. In addition the exemplification of WO 02/092668 shows that the molecules of the prepared stabilizers as determined by gel permeation chromatography is between 1000 and 1500 grams/mole.

One type of particulate polymers with properties corresponding to the properties of hyperbranched polymers comprises an inorganic $Si_xO_{(1.5)x}$-core with one T group per Si atom and is known as POSS (polyhedral oligosilesquioxanes). The most common compound of this class is a POSS with x=8 and substantially cubic structure (C. Sanchez, G. J. de A. A. Soler-Illia, F. Ribot, T. Lalot, C. R. Mayer, V. Cabuil; *Chem. Mater.*, (2001), 13, 3066). The manufacture of POSS is expensive (M. C. Gravel, C. Zhang, M. Dinderman, R. M. Laine; *Appl. Organometal. Chem.*, (1999), 13, 329-336 and WO 01/10871) and their industrial applicability is therefore limited.

Another type of particulate polymers with properties corresponding to the properties of hyperbranched polymers consists of an inorganic $Si_xO_{(1.5)x}$ core that carries one T group per Si atom and may be manufactured in a sol-gel process through controlled hydrolysis and condensation of a silane with a structure:

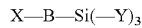

Where Y is chosen among hydrolysable residues and X—B basically corresponds to the T group. The process is described e.g. in Applicant's own WO publication No. 0208343. Sol-gel processes may be cost efficient so that they may be conducted in industrial scale from favourable raw materials and under mild conditions, i.e. without use of high pressures or high temperatures and without particular precautions like extreme dilution or the like. Thus particulate polymers with properties corresponding to properties of hyperbranched polymers manufactured by sol gel processes are industrially applicable in many areas.

Many examples of utilization of sol gel products in polymer products are known (DE 199 33 098, EP 666 290). Normally the main focus is placed upon the inorganic $Si_xO_{(1.5)x}$ core with a size in the nanometer range and thereby upon the sol-gel product as inorganic nano particle, cf. DE 199 33 098 and EP 486 469. The inorganic residues X—B are typically used to anchor the sol gel products in an organic matrix, cf. EP 486 469.

The sol gel process involving hydrolysis and condensation of a silane in which the X—B group contains one or more amide groups is particularly simple because no external catalyst is needed and because the process may be conducted at ambient temperature or under moderate heating. One example is controlled hydrolysis and condensation of γ-aminopropyl trialkoxysilane as described in applicant's own patent application, WO publication No. 0208343. Controlled hydrolysis and condensation of silanes in which the X—B groups contains one or more amide groups typically leads to a sol in which the resulting particulate polymer product has an organic/inorganic structure (hybrid polymer) that is comparable with a hyperbranched polymer product with a number of more or less free amine groups in the T groups. Such organic/inorganic hybrid polymers exhibits a large number of functional T groups compared to their weight and/or volume. At the same time its compact structure compared to the structure of linear polymers ensures desirable properties like low viscosity and good admixing properties with thermoset plastics and thermoplastics. An example of an organic/inorganic hybrid polymer with properties corresponding to a hyperbranched polymer is shown by Formula 3:

FORMULA 3

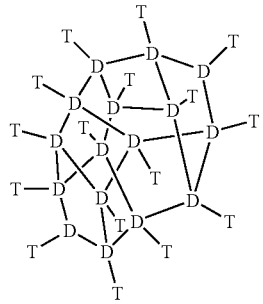

D = dendritic branching based on $SiO_{1.5}$
T termination (functional T-groups)
D-groups that are bonded to fewer than three D units do not carry hydrolysed and/or condensed substituents Use of fat-soluble metal compounds in which the metal is present in its highest stable oxidation state at standard conditions and/or organic/inorganic hybrid polymers with properties similar to hyperbranched polymers can improve the compatibility between different thermoplastics. In addition polymer compositions, e.g. in the form of compounds comprising at least one polyolefin and at least one of the following components
  a) a thermoplastic which is not a polyolefin,
  b) hyperbranched organic/inorganic hybrid polymer comprising an inorganic core carrying an organic branches, core and branches forming a particle structure,
  c) fat-soluble metal compound in which the metal is present in its highest stable oxidation state at standard conditions (25° C. and maximum 98% humidity)
in addition to known polymer additives (Hans Zweifel (ed.), Plastics Additives Handbook, Carl Hanser Verlag, München, (2001)) can be used in applications other than that of pure thermoplastic materials including compositions thereof.

Objects

It is an object of the present invention to provide polymer compositions comprising at least one polyolefin, for which properties like weather resistance, scratch resistance, viscosity, degree of cross-linking, shelf life, barrier properties, flame and temperature resistance, rigidity, retention of additives and/r degradation products, and controlled release of additives easily can be adapted in dependence of the relevant application.

The Invention

The above mentioned objects are achieved by means of a polymer composition as claimed in claim 1.

According to another aspect the invention concerns use of such a polymer compositions, as claimed in claims 17-19.

Preferred embodiments of the invention are disclosed by the dependent claims.

The difference between the methods of manufacture of the polybranched organic/inorganic hybrid polymers defined by claims 2 and 12 respectively solely depends on whether the starting organic amino-functional silanes used are hydrolysed and condensed or not hydrolysed. In the latter case hydrolysis and condensation form the first step in a process comprising at least two steps. In the former case such a step obviously is redundant and therefore omitted. The skilled artisan will furthermore understand that the group X—B is chosen such that it will not be hydrolysed under the conditions that will be applied for the method.

In either case free amine groups are modified through a chemical substitution after the completed silane hydrolysis and condensation. Suitable chemical substitutions are conducted between the free amine groups in the T groups and reactive compounds that preferably react actually quantitatively with more or less free amine groups at temperatures typically below 470 K and pressures typically lower than 0.3 MPa.

Particularly interesting are sol-gel processes by which the T groups may be chemically modified in one or more steps immediately after the hydrolysis and condensation has been completed and for which the reactor equipment used for the silane hydrolysis and condensation may be employed. Such batch processes form the basis for a very cost efficient manufacture of particulate organic/inorganic polybranched polymers which can carry a large number of different T groups and which therefore may be used in a large number of different industrial areas of application.

By reactions typical for primary and secondary amines is meant addition reactions, substitution reactions and combinations of such reactions with suitable reactant such as, but not limited to, compounds comprising epoxy groups, isocyanate groups, reactive double bonds, substitutable groups, and proton donating groups.

By an alternative or supplementary modification an acid is added, which may be a Lewis acid or a Broensted acid, and which is able to cause an addition to N atoms in the X—B group in order to convert such N atoms to quaternary nitronium ions.

By controlled hydrolysis and condensation in this description is understood hydrolysis and condensation of a silane compound as described in WO publication No. 0208343 with the difference that the reaction mixture includes a suitable stabilizer that prevents oxidative degradation of reactants and reaction products during hydrolysis and condensation and subsequent modification.

The first step is hydrolysis of a suitable silane compound, $R'—Si(OR)_n$, wherein the group R' does not participate in the hydrolysis or condensation reactions. Alkoxide ligands are replaced by hydroxyl groups:

Si—OR+H—OH Si—OH+ROH

A controlled amount of water and a controlled amount of a glycol based solvent is added during this step. The reaction temperature and the reaction time are also controlled.

The second step is condensation in which the hydroxyl group can react with hydroxyl groups or alkoxy groups from other silicon centres and form Si—O—Si bonds and water or alcohol respectively:

Si—OH+HO—Si Si—O—Si+$H_2O$ or

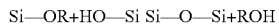
Si—OR+HO—Si Si—O—Si+ROH

To manufacture particles of a certain size it is required to establish chemical conditions that ensures a correct balance between the kinetics of the two reactions, namely condensation and hydrolysis. While the condensation contributes to formation of polymer chains from (single) monomer molecules, the hydrolysis contributes to a polycrystallinic precipitation or oxohydroxide precipitation. The combination of amino-functional silanes and exchange of alkoxide groups with strong ligands will moderate the hydrolysis reaction, which will ensure that the polymer chains not become too long but remain in the size of oligomers. In practice the particles will be prepared with a size of few nanometers, more typically less than 10 nm. A suitable stabilizer is normally added to the reaction composition to avoid oxidative degradation of reactants and reaction products during hydrolysis and condensation and subsequent modification. The resulting solution is comprised of inorganic polymer particles dispersed in a solvent.

According to the present invention component d) of the composition may be manufactured by a sol-gel process comprising at least two steps in a defined chronological sequence. In the first steps the core is prepared by controlled hydrolysis and condensation of a silane with formula:

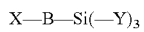

with the provisions and definitions stated in claim 4.

In the second step the organic branches is developed by a substitution of N—H hydrogen atoms of the X—B group through reactions that are typical for primary and secondary amines and/or by the alternative modification mentioned above. In the first mentioned type of reactions suitable reactants are reactive compounds such as epoxides, cyclic and non-cyclic acid derivatives, blocked and unblocked isocyanates, compounds with reactive double bonds, aldehydes, ketones, proton donating compounds, and compounds R—X that comprises a) a suitable atom or atom group X and a group R, in which R—X may react with more or less free amine groups in a substitution reaction in which an atom or an atom group X is replaced by an amine group (Endre Berner, "Laerebok i organisk kjemi", Aschehoug & Co., Oslo (1964), s. 144-147) and where the group R is chosen among non-substituted saturated or unsaturated $C_1$-$C_{24}$ alkyl, substituted saturated or unsaturated $C_1$-$C_{24}$ alkyl, non-substituted or substituted aryl, aliphatic or aromatic carbonyl, while the carbon chains of said compounds optionally can contain one or more of the elements oxygen, nitrogen, sulphur, phosphorous, silicon, and boron; or groups chosen among condensation products or addition products of one or more types of chemical compounds such as acids, alcohols, phenols, amines, aldehydes, or epoxides in which the atom or atom group X preferably is chosen among halogen, substituted or non-substituted alkoxyl, phenoxyl, amine, carboxylate, sulphonate, sulphinate, phosphonate, or phosphinate.

When step i) is an addition reaction it is convenient and preferred that this is conducted by substitution of the N—H hydrogen atom with ant A=B double bond where A, B are chosen among the elements C, O, N, S and P. According to an also preferred alternative the addition reaction involves ring opening of an epoxide group that optionally may be succeeded by reaction (substitution) with a ketone or an aldehyde. Yet another preferred embodiment for the accomplishment of the addition reaction consists in a reaction at the N—H hydrogen atom with a blocked or unblocked isocyanate. Still another preferred embodiment for accomplishing the addition reaction includes ring opening of a cyclic acid anhydride or derivative thereof, such as a carbonic acid derivative. Also a combination of such reactant as mentioned above may be used for the desired addition reaction.

For some objects is preferred that the developed branches in the organic/inorganic hybrid polymers includes groups that are derivatives of 2,2,6,6-tetramethylpiperidine or derivatives of phenol.

When using an addition reaction a molar excess of the reactant causing the addition reaction may be added if desired, leading to repeated addition reactions which in practice involves a polymerization of the organic branches.

As reactant when using at least one substitution reaction in step i) a mono functional carboxylic acid or a derivative of a sulphinic or sulphonic acid may be used.

In step ii) the acid used can be a Lewis acid or a Broensted acid.

The method of manufacture according to the invention is not dependent upon a certain type of reaction medium and may be conducted in both aqueous and organic based dispersion agents. It is particularly surprising and beneficial that it is also applicable in water based media, which is also environmentally favourable. Presence of the organic/inorganic hybrid polymer may stabilize the polymer composition and may act to cross-link polymer chains in the composition.

For particular purposes it is preferred to use particularly selected reactants that lead to specific properties for the particulate, polybranched, organic/inorganic hybrid polymer. For example, in order to obtain a product with flame retardant properties it is advantageous to use reactants that comprise halogen for the reaction exemplified as addition reaction or substitution reaction. If a particularly hydrophobic end product is desired it may be advantageous to use at least one fluorinated reactant in step i) and/or ii) of the method according to the invention.

For further use or treatment of the particulate, polybranched organic/inorganic hybrid polymer it is convenient that it has at least one polymerizable double bond, such as part of an acryl group, vinyl group or an unsaturated fatty acid.

Examples of suitable epoxides for an addition reaction are monoglycidyl compounds that may be represented by:

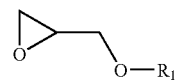

where $R_1$ is chosen among groups like hydrogen, non-substituted saturated or unsaturated $C_1$-$C_{24}$ alkyl, substituted saturated or unsaturated-$C_1$-$C_{24}$-alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ is chosen from condensation products or addition products of one or more type of chemical compounds such as acids, alcohols, phenols, amines, aldehydes or epoxides.

Examples of suitable epoxides include compounds with epoxidized C=C double bonds that may be represented by:

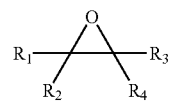

where $R_1$-$R_4$ are chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ is chosen from condensation products or addition products of one or more type of chemical compounds such as acids, alcohols, phenols, amines, aldehydes or epoxides.

Examples of reactive double bonds are A=B double bonds where A, B are chosen among the elements C, O, N, S and P.

Examples of acid derivatives are:

| Derivatives of carboxylic acids |  |
|---|---|
| Derivatives of sulphonic acids | 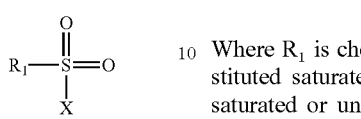 |
| Derivatives of sulphinic acids | 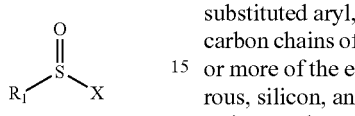 |
| Cyclic acid derivatives<br>n = 0–10<br>Y = O, S, N—$R_1$ | 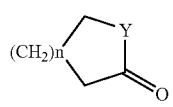 |
| Carbonic acid derivatives<br>Y = O, S, N—$R_1$, Z = O, S, N—$R_1$ | 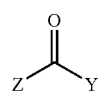 |
| Cyclic acid anhydrides and corresponding derivatives<br>n = 0–10<br>Y = O, S, N—$R_1$ | 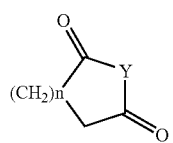 |
| Cyclic carbonic acid derivatives<br>n = 0–10<br>Y = O, S, N—$R_1$, Z = O, S, N—$R_1$ | 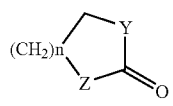 |

Where $R_1$ is chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ is chosen from condensation products or addition products of one or more type of chemical compounds such as acids, alcohols, phenols, amines, aldehydes or epoxides and X is a suitable exit group such as halogen, substituted or non-substituted alkoxy, phenoxy, amine, carboxylate, sulphonate, sulphinate, phosphonate, or phosfinate.

Examples of suitable isocyanates may be represented by:

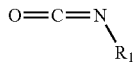

Where $R_1$ is chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ is chosen from condensation products or addition products of one or more type of chemical compounds such as acids, alcohols, phenols, amines, aldehydes or epoxides and where the isocyanate group my be blocked by means of known chemical substances.

Examples of suitable aldehydes and ketones may be represented by:

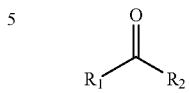

Where $R_1$ is chosen among groups like hydrogen, non-substituted saturated or unsaturated $C_1$-$C_{24}$ alkyl, substituted saturated or unsaturated $C_1$-$C_{24}$ alkyl, substituted or non-substituted aryl, aliphatic or aromatic carbonyl, in which the carbon chains of said compounds optionally may contain one or more of the elements oxygen, nitrogen, sulphur, phosphorous, silicon, and boron or where $R_1$ is chosen from condensation products or addition products of one or more type of chemical compounds such as acids, alcohols, phenols, amines, aldehydes or epoxides.

An example of a combination of reactions is
a) substitution of N—H hydrogen atoms at the non-hydrolyzable substituent X—B group by an epoxide, resulting in the formation of an aminoalcohol,
b) substitution of the aminoalcohol by a ketone or an aldehyde resulting in the formation of an oxazolidine.

In the manufacture of a polybranched, organic/inorganic hybrid polymer by a sol-gel process, the hybrid polymer having the form of an inorganic core and organic branches, a suitable stabilizer is normally added to the reaction composition to prevent oxidative degradation of the reactants and reaction products during hydrolysis and condensation and subsequent modification of X—B—Si(—Y)$_3$. Suitable stabilizers are radical scavengers based on hindered amines, one or more antioxidants or a combination of same (Hans Zweifel (ed.), Plastics Additives Handbook, Carl Hanser Verlag, München, (2001), 10-19).

By first hydrolysing the molecules that comprises the organic core and thereafter through suitable reaction, addition or addition, attach the organic branches thereto, the method of the present invention thereby provides a particularly high degree of branching and a control of the particle size in the thus produced sol that has never before been achieved. This leads to several advantages. Firstly the hydrolysis may be conducted more completely than what is the case if the particle composition includes some very large particles. Secondly the risk that water used for the hydrolysis to some extent unintentionally reacts with active groups in the organic parts of the molecule is avoided.

The invention thus provide a possibility of manufacturing a large number of differently functionalized organic/inorganic hybrid polymers with properties corresponding to the properties of hyperbranched polymers, through a simple two step batch process under mild conditions (T<470 K and pressure P<0.3 MPa).

Such organic/inorganic hybrid polymers have properties that are comparable with the properties of organic, hyperbranched polymers and may be used for many applications, like functional additives in thermoplastics and thermoset plastics, e.g. as antioxidant, UV absorb or radical scavenger, as cross-binder in thermoplastics and thermoset plastics, as component in adhesives, lacquers and coating products and as functional material in other connections. Used as additive the polybranched hybrid polymers prepared according to the invention contribute to a lasting increase in scratch resistance and weather resistance for the products in which they are used.

Temperature and stability during hydrolysis of the organic/inorganic hybrid polymers according to the invention are better than those of the organic hyperbranched polymers due to stable Si—O bonds in the polymer core and due to the core's compact structure with a very high degree of cross-linking.

Reversible viscosity changes is observed during heating/cooling due to the particulate structure with a stable inorganic core and function carrying organic groups that are bonded to the inorganic core, which is important in connection with the subsequent treatment/processing of products based on the invention.

The choice of method for the manufacture of materials and products according to the invention enables an industrial utilization of the invention in a cost efficient manner. The manufacture of materials and products according to the invention is based on a batch process under mild conditions (T<470 K and pressure P<0.3 MPa) in which the raw materials are chosen among a definite group of inexpensive silanes and bulk chemicals that are used in large quantities in industrial utilizations of polymers By convenient choice of raw materials for the method according to the invention, stabilizers, coating forming additives or other additives may be manufactured. Such stabilizers or other additives provide a broader range of applications than what is the case for known, mono functional stabilizers and may be used in lacquers, paints, thermoset plastics and thermoplastics. By convenient choice of raw materials one may for instance in combination with a suitable polymer achieve an excellent barrier layer for molecules in gas and liquid form, like water, $O_2$, $CO_2$ and hydrocarbons.

The invention furthermore concerns additives for avoiding leakages of additives and/or degradation products. Correspondingly self-organizing networks may be formed, such as in adhesives or thermo-stable/thermo-reversible networks that find use in functional materials.

Fat-soluble metal compounds for use in a composition according to the invention may be prepared (manufactured) by reacting a metal salt with an acidic, organic compound in a process in which a suitable oxidation agent ensures that all the metal in the end product is present in its highest stable oxidation step at standard conditions (25 C and maximum 98% humidity). The acidic, organic compound can e.g. be a $C_8$-$C_{24}$ fatty acid or a $C_8$-$C_{24}$ fatty acid derivative. A particular feature of the manufacturing process can involve the use of a completely or partially halogenated $C_8$-$C_{24}$ fatty acid or derivative thereof. Another particular feature of the manufacturing process can be that the $C_8$-$C_{24}$ fatty acid or $C_8$-$C_{24}$ fatty acid derivative is completely or partially unsaturated. A third particular feature of the manufacturing process can be that the oxidation agent used is hydrogen peroxide or an organic peroxide.

Per se known polymer additives are described by Hans Zweifel (Hans Zweifel (ed.), Plastics Additives Handbook, Carl Hanser Verlag, München, (2001)).

The polymer composition according to the invention may have the form of an independent, homogenous product, i.e. that all the components are evenly distributed in a polymer matrix. The polymer composition may also constitute a layer of a laminate in which the other layers may have a composition that either fall within or not fall within the definition of the polymer composition according to the invention. In cases where the other layers do not fall within the definition according to the invention, these layers may be polymers of one or more components or substrates of another type, i.e. not polymers. The polymer composition may also have the form of a tube that either is a complete product or constitutes a protecting film around other components that similar to the layers of the laminate structure either may fall within or not fall within the definition of the polymer composition according to the present invention.

With "partially heterogeneous structure" inn this context is understood a product that does not have a uniform structure throughout but may have a composition in the form of a laminate in which each layer is homogenous but different from the composition of at least one other layer.

The polymer composition may, however, also have a heterogeneous structure (product) in which each layer separately do not fall within the definition of the present invention, but where the product as a whole still falls within the definition of the product. For example, component d) and e) may constitute a majority of one layer of the product while another layer of the product may be a pure polymer such as PE or PP.

A polymer composition according to the invention may be used as a transition (intermediate) layer between a coating based on a polybranched organic/inorganic hybrid polymer and a thermoplastic (material).

EXAMPLES

Experiment 1

Manufacture of a polybranched organic/inorganic hybrid polymer by a sol-gel process.

a) 221.4 g (1.00 mol) γ-aminopropyltriethoxysilane (A-1100, GE Silicones, USA) was placed in a 1000 ml round bottom flask with hose cooler and magnetic stirrer. A mixture of 93.6 g (0.60 moles) butyldiglycol (BDG) and 22.5 g (1.30 moles) water and 1.00 g Tinuvin 123 (Ciba Specialty Chemicals, Switzerland) was added. The mixture was heated in an oil bath at 110° C. under reflux for 45 minutes. Thereafter the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml distillate was recovered. The reaction product was a clear, uncoloured liquid with a Gardner Color=1 (according to. Gardner Color Scale/ASTM D1544)

b) The reaction product from a) was heated to 70° C. to obtain a clear liquid. Then 256.4 g (1.00 moles) of Araldite DY-E (glycidylether of $C_{12}$-$C_{14}$-alcohol, Vantico AG (Huntsman AG), Switzerland) was added and the reaction mixture was held at 70° C. for an hour. A clear product with a Gardner Color=1, having the form of a viscous gel at 20° C. and a non-viscous liquid at 90° C., was obtained.

The distillate in a) comprises insignificant amounts of volatile amine. In a corresponding experiment in which no stabilizer (like e.g. Tinuvin 123) was used during the manufacturing process, the distillate in a) comprises relatively large amounts of the volatile amine products, which mainly is due to degradation of A-1100 during the synthesis.

Experiments 2-7

The manufacture of a polybranched organic/inorganic hybrid polymer by a sol-gel process like under experiment 1, but with use of other epoxide compounds or a mixture of epoxide compounds in step b). The following products were prepared:

| Experiment # | Silane | Epoxide 1 | Epoxide 2 | Gardner-Colour |
|---|---|---|---|---|
| Experiment 2 | A-1100 | Araldite DY-E (512.8 g; 2.00 moles) | — | 1 |
| Experiment 3 | A-1100 | Araldite DY-K (164.2 g; 1.00 moles) | — | 1-2 |
| Experiment 4 | A-1100 | BGE (130.2 g; 1.00 moles) | — | 1 |
| Experiment 5 | A-1100 | BGE (65.1 g; 0.50 moles) | Araldite DY-K (82.1 g; 0.50 moles) | 1 |
| Experiment 6 | A-1100 | BGE (65.1 g; 0.50 moles) | MGE (71.1 g; 0.50 moles) | 1 |
| Experiment 7 | A-1100 | BGE (65.1 g; 0.50 moles) | FGE (77.1 g; 0.50 moles) | 2 |

BGE = tert-butylglycidylether, CAS [7665-72-7], Sigma-Aldrich Norway AS
MGE = Glycidylmethacrylate, CAS [106-91-2], Sigma-Aldrich Norway AS, stabilized with addition of 0.2% antioxidant hydroquinin monomethylether CAS [150-76-5], Sigma-Aldrich Norway AS
Araldite DY-K = glycidyl-2-methylphenylether, CAS [2210-79-9], Huntsman AG, Switzerland
FGE = furfurylglycidylether, CAS [5380-87-0], Sigma-Aldrich Norway AS All products were viscous gels at 20° C. and non-viscous liquids at 90° C.

Experiment 8

Comparison example to Example 5 in which a bifunctional epoxide is used as epoxide 2:

| Experiment nr. | silane | Epoxide 1 | Epoxide 2 | Gardner-Color |
|---|---|---|---|---|
| Experiment 8 | A-1100 | BGE (65.1 g; 0.50 moles) | Araldite DY-C (128.2 g; 0.50 moles) | 1 |

Araldite DY-C = 1,4-Bis(2,3-epoxypropoxy)-methylcyclohexane, Huntsman AG, Switzerland.

The product was a clear gel that does not become less viscous when heated. At 200° C. the product starts to degrade with no apparent viscositu change.

Experiment 9

Comparison experiment to Experiment 3, in which step b) was conducted prior to step a):

| Experiment nr. | Silane | Epoxide 1 | Epoxide 2 | Gardner-Color |
|---|---|---|---|---|
| Experiment 9 | A-1100 | Araldite DY-K (164.2 g; 1.00 moles) | — | 4-5 |

The product was a clear gel but had much stronger colour than the product of Experiment 3.

Experiment 10

The manufacture of a polybranched, organic/inorganic hybrid polymer by a sol-gel process while also including an UV absorber during the manufacture:

a) 221.4 g (1.00 moles) of γ-aminopropyltriethoxysilane (A-1100, GE Silicones, USA) was placed in a 1000 ml round bottom flask with hose cooler and magnetic stirrer. A mixture of 93.6 g (0.60 moles) butyldiglycol (BDG) and 22.5 g (1.30 moles) of water and 1.00 g Tinuvin 123 (Ciba Specialty Chemicals, Switzerland) was added. The mixture was heated in an oil bath at 110° C. under reflux for 45 minutes. To the still warm reaction product a heated solution of 12.0 g Cyasorb UV-1164 (Cytec Inc., USA) dissolved in 36 ml toluene, was added. Thereafter the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 226 ml distillate was recovered. The reaction product was a clear liquid with a Gardner Colour=3 (according to. Gardner Colour Scale/ASTM D1544).

The reaction product from a) was heated to 70° C. to obtain a clear liquid. Then 512.8 g (1.00 mol) Araldite DY-E (glycidylether of $C_{12}$-$C_{14}$-alcohol, Vantico AG (Huntsman AG), Switzerland) was added and the reaction mixture was held at 70° C. for an hour. The obtained product was clear with a Gardner Color=3, which is a viscous gel at 20° C. and a non-viscous liquid at 90° C. AT 20° C. the product after a few hours shows sign of crystallization. The product again became clear and non-viscous when reheated to 70° C.

Experiment 11

Manufacture of polybranched, organic/inorganic hybrid polymer by a sol-gel process followed by a two step modification:

a) 221.4 g (1.00 mol) of γ-aminopropyltriethoxysilane (A-1100, Crompton Corporation (GE Plastics), USA) is placed in a 1000 ml round bottom flask with hose cooler and magnetic stirrer. A mixture of 93.6 g (0.60 moles) of butyldiglycol (BDG) and 22.5 g (1.30 moles) of water and 1.00 g Tinuvin 123 (Ciba Specialty Chemicals, Switzerland) was added. The mixture was heated in an oil bath at 110° C. under reflux for 45 minutes. Then volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml of distillate was recovered. The reaction product was a clear, uncoloured liquid with a Gardner Color=1 (according to. Gardner Color Scale/ASTM D1544).

b) The reaction product from a) was heated to 70° C. to obtain a clear liquid. Then 130.2 g (1.00 moles) of tert-butylglycidylether was added and the reaction mixture was held at 70° C. for an hour. A solution of 98.1 g (1.00 moles) of cyclohexanone in 100 ml of toluene was added. The reaction mixture was boiled with reflux for 15 minutes and thereafter the volatile reaction products or reactants were removed by vacuum distillation. A clear product with a Gardner Colour=2 was obtain, having the form of a viscous gel at 20° C. and a non-viscous liquid at 90° C.

Experiment 12

In a manner corresponding to Experiment 11 a polybranched organic/inorganic hybrid polymer with functional groups of the type hindered amine was prepared from triacetoneamine (2,2,6,6-tetramethyl-4-piperidinone, CAS [826-36-8], Sigma-Aldrich Norway AS).

Experiment 13

In a manner corresponding to Experiment 11 a polybranched organic/inorganic hybrid polymer with functional groups of phenolic type was prepared from 3-hydroxybenzaldehyde, CAS [100-83-4], Sigma-Aldrich Norway AS)

Experiment 14

Manufacture of polybranched, organic/inorganic hybrid polymer by a sol-gel process using an ester.
a) 221.4 g (1.00 mol) of γ-aminopropyltriethoxysilane (A-100, Crompton Corporation (GE Plastics), USA) was placed in a 1000 ml round bottom flask with hose cooler and magnetic stirrer. A mixture of 93.6 g (0.60 moles) of butyldiglycol (BDG) and 22.5 g (1.30 moles) of water and 1.00 g of the product from Experiment 12 was added. The mixture was heated in an oil bath at 110° C. under reflux for 45 minutes. Then volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml of distillate was recovered. The reaction product was a clear, uncoloured liquid with a Gardner Color=1 (according to. Gardner Color Scale/ASTM D1544).
b) The reaction product from a) was heated to 70° C. to obtain a clear liquid. Then 136.2 g (1.00 mole) of methylbenzoate (CAS [93-58-3], Sigma-Aldrich Norway AS) and 0.5 g of acetic anhydride (CAS [108-24-7], Sigma-Aldrich Norway AS) in 150 ml toluene was added and the reaction mixture was boiled with reflux for an hour. Then volatile reaction products or reactants were removed in a vacuum distillation. The reaction product was a clear, and had a Gardner Colour=1, having the form of a viscous gel at 20° C. and a non-viscous liquid at 90° C.

Experiment 15

Manufacture of polybranched, organic/inorganic hybrid polymer by a sol-gel process using an isocyanate.
a) 221.4 g (1.00 mol) of γ-aminopropyltriethoxysilane (A-1100, Crompton Corporation (GE Plastics), USA) was placed in a 1000 ml round bottom flask with hose cooler and magnetic stirrer. A mixture of 93.6 g (0.60 moles) of butyldiglycol (BDG) and 22.5 g (1.30 moles) of water and 1.00 g of the product from Experiment 12 was added. The mixture was heated in an oil bath at 110° C. under reflux for 45 minutes. Then the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 192 ml of distillate was recovered. The reaction product was a clear, uncoloured liquid with a Gardner Colour=1 (according to. Gardner Color Scale/ASTM D1544).
b) The reaction product from a) was heated to 70° C. to obtain a clear liquid. Then 155.4 g (1.00 mole) of octyl-isocyanate (CAS [3158-26-7], Sigma-Aldrich Norway AS) was added and the reaction mixture was held at 70° C. for an hour. A product is obtained which is white and waxy at 20° C. and which is a non-viscous liquid with a Gardner Color=1 at 90° C.

Experiment 16

The product from Experiment 6 is applied to a plasma treated polyethylene sheet (Borealis AS, Norway) and cured by heating the sheet with the product applied from Experiment 5 to 160° C. for 2 hours and 80° C. for 16 hours. A continuous coating with a good adhesion to the polyolefinic surface is formed. The coating is not dissolved from the polyolefinic surface when left in xylene in 180 hours at 40° C.

Experiment 17

The products from Experiment 1, 2 and 12 were compounded into a polypropylene homo polymer (HG430MO, Borealis AS) by means of a Clextral specially instrumented double helix extruder. The amount of polybranched, organic/inorganic hybrid polymer was 5% in all cases. The compounded products were injection moulded by means of a Battenfeld injection moulding apparatus to sample rods according to ASTM D3641. The sample rods were homogenous and about as transparent as injection moulded polypropylene homo polymer without polybranched, organic/inorganic hybrid polymer.

Experiment 18

The viscosity of the product from Experiment 12 was measured in a rheometer of the type Physika MCR 300 at 20° C. og 90° C. The measurements were conducted three times for each sample and the mean value at each temperature was calculated. The result is shown in the table below. For comparison the viscosity of the POSS compound Isooctyl-POSS (cage mixture; Sigma-Aldrich Norway AS, ref.-nr. 560383) was also measured. The table also shows the viscosity values for n-butanol at the same temperatures (Handbook of Chemistry and Physics, CRC Press, 71. ed., (1990-1991)).

| Compound | Viscosity at 20° C. [mPa*s] | Viscosity at 90° C. [mPa*s] |
| --- | --- | --- |
| Experiment 12 | 800 000 | 800 |
| POSS | 16 000 | 200 |
| n-butanol | 3 | ~0.7 |

The relative change in viscosity shown for the result of Experiment 12 (according to the invention) is of a factor 1000 while it for the comparison examples is of a factor 80 (POSS) and less than 5 (n-butanol).

Experiment 19

Sample rods for testing as prepared in Experiment 17 and comprising polybranched, organic/inorganic hybrid polymer prepared in Experiment 1, were tested for tensile strength according to ASTM D638. The results from these tests are characterized by the samples' E module [MPa], maximum tensile strength [MPa] and break elongation [%]. Table 5 and table 6 show the results of the tensile strength testing.

Polymer composition 1 corresponds to a pure homo polymer of the type HG430MO (Borealis AS, Norway).

Polymer composition 2 was comprised by 90% PP-homo polymer of the type HG430MO and 10% polybranched organic/inorganic hybrid polymer as manufactured in Experiment 1. The sample rods were cooled to 25° C. immediately after the injection moulding.

Polymer composition 3 was comprised by 90% PP-homo polymer of the type HG430MO and 10% polybranched organic/inorganic hybrid polymer as manufactured in Experiment 1. After the injection moulding the sample rods were post-cured at 130° C. for an hour before being cooled to 25° C.

| Polymer composition No. | E-module [MPa] | Maximum tensile strength [MPa] | Break elongation [%] |
|---|---|---|---|
| 1 | 1550 | 34.5 | <20 |
| 2 | 1115 ± 74 | 26.2 ± 0.3 | 258 ± 123 |
| 3 | 1319 ± 77 | 27.7 ± 0.6 | 163 ± 38 |

The results in the table show that the polymer composition according to the invention compared to pure thermoplastic materials can have a substantially improved elongation of break, while the reduction of maximum tensile strength is acceptable.

Experiment 20

Manufacture of a fat-soluble ferric compound ("Nor-X").

The synthesis was conducted in a heatable 5 liter glass reactor with feeding funnels, a mechanically operated glass stirrer, a glass mantled thermometer, a distillation cooler, an adjustable air inlet and a bottom valve. 2.180 kg (7.66 moles) of stearic acid was melted in the reactor. The air inlet was adjusted to about 200 ml air per minute and the temperature in the reactor was controlled to 120° C. 600 grams (2.22 moles) of ferric chloride hexahydrate was dissolved in 600 ml of water to obtain about 900 ml of an aqueous ferric chloride solution. This solution was added through one of the feeding funnels at a rate of about 20 ml per minute to the melted stearic acid. The total addition of aqueous ferric chloride solution was controlled to ensure that the amount of distilled water and hydrogen chloride corresponded to the amount aqueous ferric chloride solution added. Continuous addition of air and a 2 ml per minute addition of a 3% aqueous hydrogen peroxide solution through the other feeding funnel ensured that oxidation state III of the ferric ions were maintained. After completed addition of aqueous ferric chloride solution the mixture was boiled and distilled under continuous addition of air and a 5 ml per minute addition of a 3% aqueous hydrogen peroxide solution until the distinct yellow colour of aqueous ferric chloride solution no longer could be observed. Then the ferric stearate product was drained through the bottom valve into 10 liter of aqueous hydrogen peroxide solution. When the following gas development is about to terminate the ferric stearate product is filtered from the liquid phase and thoroughly washed with water to remove any remains of ferric chloride. The ferric stearate product is then dispersed in a 1% aqueous hydrogen peroxide solution at 55 C for 2 hours by means of a dispersing rod. The dispersed ferric stearate product is filtered from the liquid phase, thoroughly washed with water and dried in a convection oven at 50° C.

Experiment 21

Polymer composition based on PP homo polymers (HG430MO), LLDPE (Exact 0230, Exxon), polybranched organic/inorganic hybrid polymer as manufactured in Experiment 2, fat-soluble ferric compound ("Nor-X", cf. Exp. 20) and a stabilizing composition (50% Irgafos 168, Ciba Specialty Chemicals and 50% Cyasorb UV-2908, Cytec).

The table below shows that polymer compositions according to the present invention can exhibit properties of materials that are superior to the properties of the thermoplastic materials employed.

| # | PP [%] | LLDPE [%] | Exp. 2 [%] | Stabilizer [ppm] | "Nor-X" [%] | Yield stress [MPa] | Break elongation [%] |
|---|---|---|---|---|---|---|---|
| 0 | 100 | 0 | 0 | 0 | 0 | 38.1 ± 1.0 | 14 ± 10 |
| 1 | 93 | 0 | 7 | 0 | 0 | 35.8 ± 0.6 | 52 ± 45 |
| 2 | 67.9 | 26.8 | 5.1 | 500 | 0.2 | 22.2 ± 0.3 | 558 ± 162 |
| 3 | 67.9 | 26.4 | 5.1 | 500 | 0.6 | 22.9 ± 0.4 | 493 ± 106 |
| 4 | 67.9 | 26.4 | 5.1 | 0 | 0.6 | 23.4 ± 0.2 | 577 ± 127 |

Experiment 22

Polymer compositions based on PP-homo polymer (HG125MO, Borealis), LLDPE (FG5190, Borealis), and fat-soluble ferric compound ("Nor-X", Experiment 20) were prepared by extrusion in a Clextral specially instrumented double helix extruder. Polymer compounds were injection moulded by means of a Battenfeld injection moulding machine to test rods according to ASTM D3641. The test rods were tested for tensile strength according to ASTM D638. The results from the tenile strength tests are defined by E module [MPa], maximum tensile strength [MPa] and break elongation [%] in the table below.

| Amount PP [%] | Amount Nor-X [%] | E-module [MPa] | Yield stress [MPa] | Break elongation [%] | MFI [10 g/min] 190° C./2.16 kg |
|---|---|---|---|---|---|
| 100 | 0 | 1550* | 34.5* | <20 | 5.4 |
| 90 | 0 | 1592 ± 126 | 33.1 ± 0.3 | 448 ± 128 | 2.5 |
| 80 | 0 | 1373 ± 102 | 30.7 ± 0.3 | 552 ± 48 | 4.2 |
| 60 | 0 | 1104 ± 158 | 25.4 ± 0.4 | 524 ± 119 | 3.1 |
| 40 | 0 | 623 ± 65 | 18.3 ± 0.2 | 416 ± 11 | 1.9 |
| 20 | 0 | 303 ± 20 | 14.9 ± 1 | 319 ± 24 | 1.4 |
| 0 | 0 | 170-210* | 12* | 740-850* | 1.0 |

| Amount PP [%] | Amount Nor-X [%] | E-module [MPa] | Yield stress [MPa] | Break elongation [%] | MFI [10 g/min] 190° C./2.16 kg |
|---|---|---|---|---|---|
| 90 | 0.5 | 836 ± 103 | 31.6 ± 0.2 | 631 ± 98 | 6.9 |
| 80 | 0.5 | 755 ± 120 | 29.5 ± 0.1 | 573 ± 96 | 6.0 |
| 60 | 0.5 | 642 ± 57 | 24.9 ± 1.2 | 468 ± 3 | 4.5 |
| 40 | 0.5 | 642 ± 31 | 25.2 ± 0.8 | 467 ± 28 | 4.3 |
| 20 | 0.5 | 328 ± 27 | 14.4 ± 0.5 | 556 ± 16 | 1.4 |

The results show that fat-soluble iron products as prepared by Experiment 20 (Nor-X) may be suitable as compatibilizer for PP/LLDPE. Polymer compositions in the table above with 0.5% fat-soluble ferric product ("Nor-X") showed excellent properties in foil blowing, which was not the case for most of the polymer compositions without "Nor-X".

Experiment 23

2824 g (12.8 moles) of γ-aminopropyltriethoxysilane (DYNASYLAN® AMEO, Degussa AG, Germany) was placed in a 5 liter reactor (NORMAG Labor-und Prozesstechnik, Ilmenau, Germany) with temperature controlled heat mantle, stirring assembly, thermometer, dropping funnel, vertical cooler with column head for rapid change between reflux and distillation and vaccuum connection (membrane pump). A mixture of 1241 g (7.7 moles) of butyldiglycol (BDG) and 298 g (16.6 moles) of water and 20 mg of (2,2,6,6-tetrametyl-4-piperidinon, CAS [2564-83-2], Sigma-Aldrich Norway AS). The mixture was heated with reflux for 45 minutes. Then volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 2690 ml of distillate was recovered. The reaction product was a clear, colourless liquid with Gardner Color=1 (according to Gardner Color Scale/ASTM D1544).

Experiment 24

Manufacture of polybranched, organic/inorganic hybrid polymer by a sol-gel process in a 5 liter reactor.

2801 g (12.7 moles) of γ-aminopropyltriethoxysilane (DYNASYLAN® AMEO, Degussa AG, Germany) was placed in a 5 liter reactor (NORMAG Labor-und Prozesstechnik, Ilmenau, Germany) with temperature controlled heat mantle, stirring assembly, thermometer, dropping funnel, vertical cooler with column head for rapid change between reflux and distillation and vacuum connection (membrane pump). A mixture of 821 g (7.6 moles) of 2-butoxyethanol (DOWANOL EB, Dow Chemical, USA) and 296 g (16.4 moles) of water and 16 mg of the reaction product of Experiment 12. The mixture was heated under reflux for 45 minutes. Then the volatile reaction products or reactants were removed in a vacuum distillation at the oil bath temperature of 110° C.-160° C. and a vacuum gradient from about 1000 mbar to less than 20 mbar. The distillation was terminated when the pressure in the round bottom flask has reached 20 mbar or less for 10 minutes. Ca. 2334 ml of distillate was recovered. The reaction product was a clear, uncoloured liquid with a Gardner Color=1 (according to Gardner Color Scale/ASTM D1544).

Available NH activity of the product was determined by complete reaction with tert-butylglycidylether (BGE). Excess BGE was removed by vacuum distillation. The manufactured product showed an available NH activity ("epoxy number") of 70 grams per epoxy equivalent.

Experiment 25

Development of the organic branches in a polybranched, organic/inorganic hybrid polymer as prepared in Experiment 24.
a) 558 g of the reaction product from Experiment 24 was heated to 70° C. Then 625 g (4.8 moles) of tert-butylglycidylether (BGE) and the reaction mixture was heated to 100° C. The reaction is strongly exothermic and by means of the controllable heat mantle was ensured that the temperature in the reaction mixture did not exceed 160° C. The reaction mixture was cooled to 80° C.
b) A hot solution of 621 g triacetoneamine (TAA) in 552 g toluene was added. The reaction mixture was heated under reflux for 20 minutes. Thereafter an azeotrope of toluene and water was distilled off, ca. 610 g. The procedure was terminated with vacuum distillation at 20 mbar or less and a temperature in the reaction mixture of 160° C. A brownish, yet clear product was obtained which was a viscous gel at 20° C. and a non-viscous liquid at 90° C.

Experiment 26

Development of the organic branches in a polybranched, organic/inorganic hybrid polymer as prepared in Experiment 24.
a) 551 g of the reaction product from Experiment 24 was heated to 70° C. Then 1460 g (5.7 moles) of Araldite DY-E (glycidylether of $C_{12}$-$C_{14}$-alcohol, Huntsman AG, Switzerland) was added and the reaction mixture was heated to 100° C. The reaction is strongly exothermic and by means of the controllable heat mantle was ensured that the temperature in the reaction mixture did not exceed 160° C. The reaction mixture was cooled to 80° C.
b) 160 g of a hot solution of Campher (CAS [76-22-2], Sigma-Aldrich Norway AS) in 280 g hexane was added. The reaction mixture was heated under reflux for 20 minutes. Thereafter an azeotrope of hexane and water was distilled off, ca. 290 g. The procedure was terminated with vacuum distillation at 20 mbar or less and a temperature in the reaction mixture of 160° C. A product was obtained which was a clear viscous gel at 20° C. and a clear non-viscous liquid at 90° C.

Experiment 27

Development of the organic branches in a polybranched, organic/inorganic hybrid polymer as prepared in Experiment 24.

480 g of the reaction product from Experiment 24 was heated to 80° C. Then 1562 g (12.0 moles) of tert-butylglycidylether (BGE) was added and the reaction mixture was heated to 100° C. The reaction is strongly exothermic and by means of the controllable heat mantle was ensured that the temperature in the reaction mixture did not exceed 160° C. The procedure was terminated with vacuum distillation at 20 mbar or less and a temperature in the reaction mixture of 160° C. A yellowish, yet clear product was obtained which was a strongly viscous gel at 20° C. and a non-viscous liquid at 140° C.

Experiment 28

Development of the organic branches in a polybranched, organic/inorganic hybrid polymer as prepared in Experiment 24.

140 g of the reaction product from Experiment 24 was heated to 70° C. Then 466 g (4.1 moles) of ε-caprolactone (CAS [502-44-3], Sigma-Aldrich Norway AS) was added and the reaction mixture was heated to 100° C. Two hours later 627 g of Araldite DY-E (glycidylether of $C_{12}$-$C_{14}$-alcohol, Huntsman AG, Switzerland) was added and the reaction mixture was heated to 160° C. The procedure was terminated with vacuum distillation at 20 mbar or less and a temperature in the reaction mixture of 160° C. 210 g of a distillate was distilled out. A clear gel which was viscous at 20° C. and non-viscous (liquid) at 90° C. was obtained.

Experiment 29

Development of the organic branches in a polybranched, organic/inorganic hybrid polymer as prepared in Experiment 24.

70 g of the reaction product from Experiment 24 was heated under agitation in a borosilicate glass flask (Schott AG, Germany) by means of a water bath to 70° C. Then 171 g (1.5 moles) of ε-caprolactone (CAS [502-44-3], Sigma-Aldrich Norway AS) was added and the reaction mixture was heated to 90° C. Two hours later 154 g Araldite DY-E (glycidylether of $C_{12}$-$C_{14}$-alcohol, Huntsman AG, Switzerland) was added and the reaction mixture was held at 90° C. for four hours under agitation. Thereafter the reaction mixture was agitated at 40° C. for a week. A clear gel which was viscous at 20° C. and non-viscous (liquid) at 90° C. was obtained.

Experiment 30

Development of the organic branches in a polybranched, organic/inorganic hybrid polymer as prepared in Experiment 24.

28 g of the reaction product from Experiment 24 was heated under agitation in a borosilicate glass flask (Schott AG, Germany) by means of a water bath to 70° C. Then 137 g (1.5 moles) of ε-caprolactone (CAS [502-44-3], Sigma-Aldrich Norway AS) was added and the reaction mixture was heated to 90° C. Two hours later 57 g oleic acid (CAS [112-80-1], Sigma-Aldrich Norway AS) was added and the reaction mixture was agitated at 40° C. for 16 hours. A clear gel which was viscous at 20° C. and non-viscous (liquid) at 90° C. was obtained.

Experiment 31

Development of the organic branches in a polybranched, organic/inorganic hybrid polymer as prepared in Experiment 24.

35 g of the reaction product from Experiment 24 was placed in a borosilicate glass flask (Schott AG, Germany). While agitating 31 g propylenecarbonate (Huntsman AG, Switzerland) was added and the reaction mixture was agitated at ambient temperature. The reaction is strongly exothermic and a clear gel which is viscous at 20° C. and non-viscous (liquid) at 120° C. was obtained.

Experiment 32

Development of the organic branches in a polybranched, organic/inorganic hybrid polymer as prepared in Experiment 24.

14.0 g of the reaction product from Experiment 24 was placed in a borosilicate glass flask (Schott AG, Germany). Then 12.3 g propylenecarbonate (Huntsman AG, Switzerland) was added under agitation and the reaction mixture was agitated at ambient temperature. The reaction is strongly exothermic and a clear gel which is viscous at 20° C. and non-viscous (liquid) at 120° C. was obtained. 34 l of a lacquer (SZ-006, Rhenania GmbH, Germany) was added. The composition was agitated at 40° C. for 40 hours. A modified lacquer was obtained which had approximately the same shelf-life as the original lacquer.

Experiment 33

Development of the organic branches in a polybranched, organic/inorganic hybrid polymer as prepared in Experiment 24.

14 g of the reaction product from Experiment 24 was placed in a borosilicate glass flask (Schott AG, Germany). Then 49 g of Araldite DY-P (p-tert-butylphenylglycidyleter, Huntsman AG, Switzerland) was added under agitation and the reaction mixture was agitated at ambient temperature. The reaction is strongly exothermic and a clear gel which is viscous at 20° C. and non-viscous (liquid) at 120° C. was obtained.

Experiment 34

Development of the organic branches in a polybranched, organic/inorganic hybrid polymer as prepared in Experiment 24.

15.4 g of the reaction product from Experiment 24 was dispersed in 40 g of water and placed in a borosilicate glass flask (Schott AG, Germany). The dispersion was agitated at 40° C. for two hours and thereafter filtered, first through a filter paper and then through a teflon membrane filter (pore size 0.45 µm). The filtrate was placed in another borosilicate flask and heated to 40° C. Then a mixture of 23 g of glycidylmethacrylate and 8 g butoxyethanol was added under agitation. The reaction mixture was agitated at 40° C. for two hours. Then 0.5 g of sodium salt of dodecylbenzenesulphonic acid (CAS [25155-30-0], Sigma-Aldrich Norway AS) was added. A clear dispersion with a very good shelf-life was obtained.

Experiment 35

Development of the organic branches in a polybranched, organic/inorganic hybrid polymer as prepared in Experiment 24.

a) 14 g of the reaction product from Experiment 24 was placed in a borosilicate glass flask (Schott AG, Germany). Then 63 g of Araldite DY-E (glycidylether of $C_{12}$-$C_{14}$-alcohol, Huntsman AG, Switzerland) was added during agitation and the and the mixture was agitated in a water bath at 80° C. for 4 hours. The reaction is strongly exothermic and a clear gel which is viscous at 20° C. and non-viscous at 90° C. is obtained.

b) 77 g of the product from a) is reacted in the same borosilicate flask with 16 g dodecylbenzene sulphonic acid (Sigma-Aldrich Norway AS). The reaction mixture is agitated in a water bath at 40 C for one hour. A clear gel which is viscous at 20 C and non-viscous at 90 C is obtained.

Experiment 36

Development of the organic branches in a polybranched, organic/inorganic hybrid polymer as prepared in Experiment 24.

560 g of the reaction product from Experiment 24 was heated in a 5 liter reactor to 70° C. Then 1268 g (5.7 moles) of Araldite DY-E (glycidylether of $C_{12}$-$C_{14}$-alcohol, Huntsman AG, Switzerland) was added and the reaction mixture was heated to 100° C. The reaction is strongly exothermic and by means of the controllable heat mantle was ensured that the temperature in the reaction mixture did not exceed 160° C. The procedure was terminated with vacuum distillation at 20 mbar or less and a temperature in the reaction mixture of 160° C. A clear product was obtained which was a viscous gel at 20° C. and a non-viscous liquid at 90° C.

Experiment 37

Development of the organic branches in a polybranched, organic/inorganic hybrid polymer as prepared in Experiment 24.

140 g of the reaction product from Experiment 24 was heated under agitation in a borosilicate glass flask (Schott AG, Germany) in a water bath at 70° C. Then 137 g of ε-caprolakctone (CAS [502-44-3], Sigma-Aldrich Norway AS) was added and the reaction mixture was heated to 90° C. Two hours later 192 g of Araldite DY-P (p-tert-butylphenylglycidylether, Huntsman AG, Switzerland) was added and the reaction mixture was held at 60° C. for 2 hours under agitation. Thereafter the reaction mixture was agitated at 40° C. for 20 hours. A clear gel which was a viscous gel at 20° C. and a non-viscous liquid at 120° C. was obtained.

Experiment 38

Development of the organic branches in a polybranched, organic/inorganic hybrid polymer as prepared in Experiment 24.

28 g of the reaction product from Experiment 24 was placed in a borosilicate glass flask (Schott AG, Germany). Then 39 g Araldite DY-K (cresylglycidylether, Huntsman AG, Switzerland) was added under agitation and the reaction mixture was agitated at ambient temperature. The reaction is strongly exothermic and a clear gel which was highly viscous at 20° C. and a non-viscous liquid at 90° C. was obtained.

Experiment 39

Development of the organic branches in a polybranched, organic/inorganic hybrid polymer as prepared in Experiment 24.

a) 28 g of the reaction product from Experiment 24 was placed in a borosilicate glass flask (Schott AG, Germany). Then 127 g Araldite DY-E (glycidylether of $C_{12}$-$C_{14}$-alcohol, Huntsman AG, Switzerland) was added under agitation and the reaction mixture was agitated in a water bath at 80° C. for 4 hours. The reaction is highly exothermic and a clear gel which was viscous at 20° C. and non-viscous liquid at 90° C. was obtained.

b) 28 g of the reaction product from Experiment 24 was placed in a borosilicate glass flask (Schott AG, Germany). Then a mixture of 115 g Araldite DY-E (glycidylether of $C_{12}$-$C_{14}$-alcohol, Huntsman AG, Switzerland) and 12 g of Araldite DY-C (bisglycidylether of cyklohexane dimethanol, Huntsman AG, Switzerland) was added under agitation. The reaction mixture was placed in a water bath at 80° C. The reaction is strongly exothermic and the reaction mixture is cured to a solid gel that contrary to the product under a) does not become liquefied when heated. When heated to above 250° C. the cured reaction product was clearly degraded.

It is thus clear that the reaction product from b) is not a particulate, polybranched organic/inorganic hybrid polymer according to the invention.

Experiment 40

Molecular weight analysis with GPC (gel permeation chromatography or size exclusion chromatography (SEC))

En row of three SEC columns based on 5 μm particles and pore sizes from 10000 Å to 100 Å was used in addition to a standard pump and a refractive index detector (RID). Cyclohexane or tetrahydrofuran was used as mobile phase and solvent respectively. The molecular weight analysis and thereby the Mp values were based on polystyrene standards. The results for a number of organic/inorganic hybrid polymers according to the invention are shown in the table below.

Results based on polystyrene as standards and cyclohexane as mobile phase:

|  | Name: | | | | | | | |
|---|---|---|---|---|---|---|---|---|
|  | Top 1 Mp: | Top 2 Mp: | Top 3 Mp: | Top 4 Mp: | Top 1 Area % | Top 2 Areal % | Top 3 Area % | Top 4 Area % |
| Exp. 26 | >1000000* | ~6000 | ~1000 | — | 7% | 44% | 49% | — |
| Exp. 28 | ~6000 | ~3000 | ~1000 | — | 48% | 28% | 24% | — |
| Exp 27 | >1000000* | ~8000 | ~3000 | ~1000 | 4% | 24% | 43% | 29% |

*Outside (beyond) the calibration curve.

Results based on polystyrene as standards and tetrahydrofuran as mobile phase:

| | Navn: | | | | | | | | | | | |
|---|---|---|---|---|---|---|---|---|---|---|---|---|
| | Top1 Mp: | Top2 Mp: | Top3 Mp: | Top4 Mp: | Top5 Mp: | Top6 Mp: | Top1 Area % | Top2 Area % | Top3 Area % | Top4 Area % | Top5 Area % | Top6 Area % |
| Exp. 33 | >1000000* | 31000 | — | — | — | — | 57% | 43% | — | — | — | — |
| Exp. 29 | ~8000 | ~1000 | ~900 | ~700 | ~600 | ~400 | 40% | 29% | 6% | 9% | 9% | 7% |

*Outside (beyond) the calibration curve

Experiment 41

An injection moulded sheet of PP-homo polymer (HE125MO, Borealis AS, Norway) was treated with $O_2$-plasma for 30 seconds (effect 500 W and flux 200 standard $cm^3$/min.).

Application of Lacquer:

The lacquer manufacture in Exp. 34 was applied to the plasma treated PP sheet by "bar coating" (rod No. 26). Immediately after coating the sheet was placed in a convection oven at 120 C for 10 minutes. The sheet was thereafter removed and cooled in air.

Testing:

The adhesion was determined by use of a standard tape test. A scratch pattern was made by the use of crosshatch cutter (test tool) from Erichsen. The tape was applied to the pattern with an even pressure. The tape was removed from the sheet and the surface against adhesive was observed in an optical microscope. The surface had small or no remains of the coating.

Experiment 42

Polybranched organic/inorganic hybrid polymer as manufactured in Experiment 38 was heated and applied to a first polyethylene sheet with a thickness of about 100 μm (LLDPE FG5190, Borealis AS, Norway). Immediately thereafter another polyethylene sheet of the same type was pressed onto the top of an organic/inorganic hybrid polymer by means of a mechanical press at 60° C. The product is a laminate LLPDE—organic/inorganic hybrid polymer—LLDPE. The layer thickness of organic/inorganic hybrid polymer was during the pressing of the laminate with a suitable metal frame adjusted to about 500 μm. The laminate layers exhibited good adhesion to one another.

Experiment 43

The components in the table below were dry blended and a film was blown on a standard labor film blowing machine (nozzle diameter about 25 cm).

| Foil number | Carrier bag LD | LLDPE FG5190 | PP HE 125 MO | Nor-X (eks. 20) | Standard white | hybrid-polymer | Foil thickn. μm | dart drop | Melt. press., bar | Melt temp. ° C. |
|---|---|---|---|---|---|---|---|---|---|---|
| 50303-01 | 93.5% | — | — | 2.5% | 4.0% | — | — | — | 356 | 188 |
| 50303-02 | 76.0% | 17.5% | — | 2.5% | 4.0% | — | — | — | 420 | 189 |
| 50303-03 | 76.0% | 15.0% | — | 5.0% | 4.0% | — | 26-34 | 226 | 412 | 188 |
| 50303-04 | — | 93.5% | — | 2.5% | 4.0% | — | — | — | 639 | 184 |
| 50303-05 | — | 91.0% | — | 5.0% | 4.0% | — | 27-47 | 125 | 628 | 180 |
| 50303-06 | — | 73.5% | 20.0% | 2.5% | 4.0% | — | 28-36 | 43 | 324 | 205 |
| 50303-07 | — | 53.5% | 40.0% | 2.5% | 4.0% | — | — | — | 239 | 210 |
| 50303-08 | — | 33.5% | 60.0% | 2.5% | 4.0% | — | — | — | 205 | 214 |
| 50303-09 | — | 13.5% | 80.0% | 2.5% | 4.0% | — | — | — | 173 | 217 |
| 50303-10 | — | — | 93.5% | 2.5% | 4.0% | — | — | — | 155 | 218 |
| 50303-11 | — | 76.0% | 12.5% | 2.5% | 4.0% | 5% VI | — | — | 396 | 183 |
| 50303-12 | — | 76.0% | 7.5% | 2.5% | 4.0% | 10% VI | 36-55 | 82 | 396 | 193 |
| 50303-13 | — | 76.0% | — | 2.5% | 4.0% | 17.5% V | 35-50 | 78 | 379 | 193 |
| 50303-14 | — | 76.0% | 12.5% | 2.5% | 4.0% | 5% I | — | — | 400 | 191 |
| 50303-15 | — | 76.0% | 12.5% | 2.5% | 4.0% | 5% II | 31-45 | 70 | 401 | 190 |
| 50303-16 | — | 80.0% | 12.5% | 2.5% | — | 5% III | — | — | 407 | 189 |
| 50303-17 | — | 80.0% | — | 2.5% | — | 17.5% IV | 26-35 | 62 | 403 | 189 |
| 50303-18 | — | 80.0% | 12.5% | 2.5% | — | 5% V | — | — | 399 | 189 |
| 50303-19 | — | 70.0% | 17.5% | 2.5% | — | 10% VII | 32-49 | 112 | 363 | 189 |
| 50303-20 | — | 80.0% | 12.5% | 2.5% | — | 5% VI | — | 60 | 400 | 189 |

Composition:

Carrier bag LD: Polyethylene composition suited for film blowing of carrier bags (Norfolier AS, Norway)
FG5190: LLDPE (Borealis AS, Norway)
HE125MO: PP homo polymer (Borealis AS, Norway)
Standard white: Colour masterbatch, ca. 60% titanium dioxide (rutile) and 40% LDPE (Norfolier AS, Norway)
Nor-X: Masterbatch base don 20% of the product from Exp. 20 and 80% LLDPE (Exact Plastomer, ExxonMobil)
Hybrid polymer: Masterbatch base don polybranched organic/inorganic hybrid polymer as manufactured according to the Experiments above and PP (HE125MO) and LLDPE (Exact Plastomer, ExxonMobil).

Masterbatch composition is more closely described by the table below (% v/v):

| | |
|---|---|
| I | 20% Exp. 36 i polypropylene |
| II | 20% Exp. 36 + 0.5% fat soluble metal compound Exp. 20 in polypropylene |
| III | 20% Exp. 37 in polypropylene |
| IV | 2.5% Exp. 29 + 12.5% titanium dioxide (rutile) + 0.5% fat-soluble metal comp. Exp. 20 in polypropylene |
| V | 20% Exp. 28 + 0.5% fat-soluble metal comp. Exp. 20 in polypropylene |
| VI | 20% Exp. 30 + 0.5% fat-soluble metal comp. Exp. 20 in polypropylene |
| VII | 10% Exp. 26 + 0.5% fat-soluble metal comp. Exp. 20 in LLDPE |

Dart drop was measured 2 weeks after the foil blowing (ISO 7765-1).

Pressure is specified as measured in the foil extruder.

Temperature specified as measured in the nozzle of the foil extruder.

It is clear that film can be blown on a standard foil extruder of dry blended components of polymer compositions according to the invention. We did not succeed in blowing film under the same conditions from blends of LLDPE (FG5190) and PP homo polymers (HE125MO), i.e. without a fat-soluble metal compound (Exp. 20) according to the invention and/or polybranched organic/inorganic hybrid polymer as manufactured according to the invention.

It is furthermore clear that the dart drop values for the film samples with polybranched organic/inorganic hybrid polymer (50303-11-50303-20) are noticeably higher than that of the film sample with corresponding composition of LLDPE and PP (50303-6).

Experiment 44

From the hybrid polymer masterbatches I, II and III in Experiment 43 injection moulded samples for tensile testing as described in Experiment 22. Mechanical testing was conducted as described in Experiment 22. The results are shown in the table below:

| Hybrid polymer masterbatch (exp. 43) | Yield stress [MPa] | Break elongation [%] |
|---|---|---|
| I | 26.4 ± 0.3 | 17 ± 3 |
| II | 28.8 ± 0.2 | 160 ± 33 |
| III | 28.9 ± 0.7 | 165 ± 63 |
| HE125MO | 35.3 ± 0.2 | 96 ± 62 |

Experiment 45

Organic/inorganic hybrid polymer as manufactured in the Experiments 25 and 33 were used as stabilizers in PP homo polymer (HG430MO, Borealis AS) and compared with a commercial stabilizer (Chimasorb 944, Ciba Specialty Chemicals, Switzerland). Injection moulded samples for tensile testing were prepared as described in Experiment 22. The compositions of the samples are shown below.

| Sample | PP | Exp. 25 | Exp. 33 | Chimasorb 944 |
|---|---|---|---|---|
| I | 99.7% | 0.3% | — | — |
| II | 99.1% | 0.3% | 0.6% | — |
| III | 99.7% | — | — | 0.3% |

The samples were exposed to accelerated ageing according to ISO 4892-3. The test instrument was an Atlas UVCON weather-o-meter (Atlas Inc., USA) equipped with UVA-340 fluorescence lamps. The test cycle of "phase A" comprised 4 hours of UV radiation at dry heating to 60° C., 30 minutes of water spraying at 10-12° C. and 3 hours and 30 minutes of condensation at 40° C. The test cycle in "phase B" comprised 4 hours of UV radiation at dry heating to 85° C., 30 minutes of water spraying at 10-12° C. and 3 hours and 30 minutes of condensation at 40° C. (the temperatures as measured by "black panel" thermometer according to ISO 4892-3).

Mechanical testing after different ageing periods were conducted as described in Experiment 22. The results are shown in the table below.

| Sample | Yield str. 0 h | Yield str. 315 h A | Yield str. 3 15 h A + 135 h B | Yield str. 315 h A + 301 h B |
|---|---|---|---|---|
| I | 35.0 ± 0.3 | 37.8 ± 0.2 | 37.5 ± 0.5 | 37.5 ± 1.4 |
| II | 35.2 ± 0.3 | 37.9 ± 0.3 | 38.7 ± 0.4 | 38.6 ± 0.6 |
| III | 36.2 ± 0.3 | 37.7 ± 0.3 | 38.3 ± 0.3 | 38.4 ± 0.2 |

| Sample | E-module 0 h | E-module 315 h A | E-module 315 h A + 135 h B | E-module 315 h A + 301 h B |
|---|---|---|---|---|
| I | 1494 ± 64 | 1537 ± 31 | 1658 ± 110 | 1660 ± 88 |
| II | 1487 ± 35 | 1561 ± 93 | 1763 ± 42 | 1800 ± 40 |
| III | 1553 ± 33 | 1554 ± 43 | 1763 ± 72 | 1667 ± 77 |

Yield str.: Yield stress [MPa]
E-module: Elasticity module [MPa]
h: hours of accelerated ageing
A: conditions as in "phase A"
B: conditions as in "phase B"

Experiment 46

In the same manner as described in Experiment 22 polymer compositions based on LLDPE (FG5 190), glass fibre filled polyethylene thereftalate (Rynite PET, DuPont), polystyrene (Empera) and poly(ethylene-co-vinylacetate) (Escorene Ultra) were prepared. In addition Nor-X masterbatch from Experiment 43 was used for half the sample series and LLDPE (Exact 0203 Plastomer, Exxon Mobil) as compatibility masterbatch in the other half of the sample series.

The relative amounts (% v/v) of components in the polymer compositions are as follows:

| Quality: | Rynite PET | LLDPE (FG5190) | LLDPE Exact |
|---|---|---|---|
| 1-a | 2% | 93% | 5% |
| 2-a | 10% | 85% | 5% |

| Quality: | Empera PS | LLDPE (FG5190) | LLDPE Exact |
|---|---|---|---|
| 3-a | 2% | 93% | 5% |
| 4-a | 10% | 85% | 5% |

| Quality: | Escorene Ultra EVA | LLDPE (FG5190) | LLDPE Exact |
|---|---|---|---|
| 5-a | 2% | 93% | 5% |
| 6-a | 10% | 85% | 5% |

| Quality: | Rynite PET | LLDPE (FG5190) | Nor-X masterbatch |
|---|---|---|---|
| 1-b | 2% | 93% | 5% |
| 2-b | 10% | 85% | 5% |

| Quality: | Empera PS | LLDPE (FG5190) | Nor-X masterbatch |
|---|---|---|---|
| 3-b | 2% | 93% | 5% |
| 4-b | 10% | 85% | 5% |

| Quality: | Escorene Ultra EVA | LLDPE (FG5190) | Nor-X masterbatch |
|---|---|---|---|
| 5-b | 2% | 93% | 5% |
| 6-b | 10% | 85% | 5% |

The results from the tensile stress test are shown in the table below.

| Material: | E Module [N/mm$^2$] | Yield stress [N/mm$^2$] | Break elongation [%] |
|---|---|---|---|
| 1-a | 194 | 11.1 | 273 |
| 1-b | 192 | 8.7 | 435 |
| 2-a | 219 | 11.2 | 309 |
| 2-b | 266 | 9.5 | 522 |
| 3-a | 201 | 11.0 | 296 |
| 3-b | 226 | 11.0 | 314 |
| 4-a | 192 | 10.5 | 402 |
| 4-b | 302 | 11.9 | 329 |
| 5-a | 168 | 11.0 | 296 |
| 5-b | 207 | 10.5 | 285 |
| 6-a | 187 | 12.0 | 250 |
| 6-b | 188 | 10.5 | 275 |

The invention claimed is:

1. Polymer composition comprising:
a) 10-99.99% by weight of at least one polyolefin,
b) up to 50% by weight of a thermoplastic that is not a polyolefin,
c) 0.005-1% by weight of per se known polymer additives,
d) a fat-soluble iron compound prepared by allowing an iron salt to react with an acidic, organic compound in a process in which a suitable oxidation means ensures that all iron in the final product is present in its highest stable oxidation state at standard conditions; and
(e) at least one polybranched organic/inorganic hybrid polymer comprising an inorganic core carrying organic branches that constitute a particle structure characterized in that the particulate polybranched organic/inorganic hybrid polymer is prepared by a sol-gel process, said sol-gel process comprising at least the following steps in chronological sequence;
A) the core is made by controlled hydrolysis and condensation of a silane of the structure:

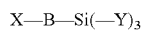

where X=NR1R2, wherein R1, and R2 are chosen among hydrogen, saturated or unsaturated C1-C18 alkyl, substituted or non-substituted aryl, in which the carbon chains of said compounds optionally include one or more of the elements oxygen, nitrogen, sulphur, phosphorous, silicon, and boron and/or optionally containing one or more hydrolysable silane units, or where R1, and R2 are chosen from condensation products or addition products of one or more type of chemical compounds such as acids, alcohols, phenols, amines, aldehydes or epoxides, B is a linkage group chosen among saturated and unsaturated C1-C18 alkylene, substituted or unsubstituted arylene in which the carbon chains of said compounds optionally include one or more branches and/or one or more of the elements oxygen, nitrogen, sulphur, phosphorous, silicon, and boron, Y is chosen among hydrolysable residues such as alkoxy, carboxyl, halogen,
B) the organic branches are developed by
i) when at least one of R1, and R2 is H, adding at least one reactant that causes N—H hydrogen atoms of the X—B group of the core to be substituted through reactions typical for primary and secondary amines, and/or
ii) adding an acid that causes an addition to the N atoms of the X—B group of the core so that the N atoms are wholly or partially converted to quaternary nitronium ions.

2. Polymer composition as claimed in claim 1, characterized in that component d) and component e) together constitute from 0.01 to 90% by weight of the polymer composition.

3. Polymer composition as claimed in claim 1, comprising
a) 10-99.99% by weight of at least one polyolefin;
b) up to 50% by weight of a thermoplastic that is not a polyolefin;
c) 0.005-1% by weight of per se known polymer additives;
d) a fat-soluble iron compound prepared by allowing an iron salt to react with an acidic, organic compound in a process in which a suitable oxidation means ensures that all iron in the final product is present in its highest stable oxidation state at standard conditions; and
(e) at least one polybranched organic/inorganic hybrid polymer comprising an inorganic core carrying organic branches that constitute a particle structure;
characterized in that the particulate, polybranched organic/inorganic hybrid polymer is manufactured by a sol-gel process based on at least partially hydrolysed organic amino-functional silanes prepared by controlled hydrolysis and condensation of a silane of the structure:

where X=NR$_1$R$_2$, wherein R$_1$, and R$_2$ are chosen among hydrogen, saturated or unsaturated C$_1$-C$_{18}$ alkyl, substituted or non-substituted aryl, in which the carbon chains of said compounds optionally includes one or more of the elements oxygen, nitrogen, sulphur, phosphorous, silicon, and boron and/or optionally containing one or more hydrolysable silane units, or where R$_1$, and R$_2$ are chosen from condensation products or addition products of one or more type of chemical compounds such as acids, alcohols, phenols, amines, aldehydes or epoxides, B is a linkage group chosen among saturated and unsaturated C$_1$-C$_{18}$ alkylene, substituted or unsubstituted arylene in which the carbon chains of said compounds optionally include one or more branches and/or one or more of the elements of oxygen, nitrogen, sulphur, phosphorous, silicon, and boron, Y is chosen among hydrolysable residues such as alkoxy, carboxyl, halogen, while N—H hydrogen atoms of the hybrid polymer subsequent to hydrolysis and condensation may be replaced by organic residues, characterized in that the organic branches are prepared by:
i) when at least one of $R_1$, and $R_2$ is H, adding at least one reactant that causes N—H hydrogen atoms of the X—B group of the core to be substituted through reactions typical for primary and secondary amines, and/or
ii) adding an acid that causes an addition to the N atoms of the X—B group of the core so that the N atoms are wholly or partially converted to quaternary nitronium ions.

4. Polymer composition as claimed in claim 1, characterized in that substitution of N—H hydrogen atoms in the branches organic/inorganic hybrid polymer in step Bi) is conducted by means of an addition reaction.

5. Polymer composition as claimed in claim 1, characterized in that substitution of N—H hydrogen atoms in the branches organic/inorganic hybrid polymer in step Bii) is conducted by means of a substitution reaction.

6. Polymer composition as claimed in claim 4, characterized in that the addition reaction comprises substitution of N—H hydrogen atoms by an A=B double bond where A and B are chosen among the elements C, O, N, S and P.

7. Polymer composition as claimed in claim 4, characterized in that the addition reaction comprises ring opening of an epoxy group.

8. Polymer composition as claimed in claim 7, characterized in that the ring opening of an epoxy group is followed by the reaction with a ketone or an aldehyde.

9. Polymer composition as claimed in claim 4, characterized in that the addition reaction comprises substitution of N—H hydrogen atoms by an isocyanate.

10. Polymer composition as claimed in claim 4, characterized in that the addition reaction comprises ring opening by a cyclic acid anhydride or ring opening by a cyclic acid derivative.

11. Polymer composition as claimed in claim 10, characterized in that the cyclic acid derivative is a derivative of carbonic acid.

12. Polymer composition as claimed in claim 5, characterized in that the substitution reaction comprises a reaction with at least one derivative of a linear or cyclic mono functional carboxylic acid.

13. Polymer composition as claimed in claim 5, characterized in that the substitution reaction comprises a reaction with at least one derivative of a linear or cyclic mono functional carboxylic acid.

14. Polymer composition as claimed in claim 1, characterized in that the acid being added in step Bii) is a Lewis acid or a Broensted acid.

15. Polymer composition as claimed in claim 1, characterized in that the substitution of N—H hydrogen atoms in step i) can be conducted in an aqueous medium and/or that the substitution in step ii) is conducted in an aqueous medium.

16. Polymer composition as claimed in claim 1, characterized in that the fat-soluble metal compound is the reaction product of a metal salt and a $C_8$-$C_{24}$ fatty acid or a $C_8$-$C_{24}$ fatty acid derivative in a process in which a suitable oxidation agent ensures that the metal is present in its highest stable oxidation state at standard conditions.

17. Polymer composition comprising;
a) 10-99.99% by weight of at least one polyolefin;
b) up to 50% by weight of a thermoplastic that is not a polyolefin;
c) 0.005-1% by weight of per se known polymer additives;
d) a fat-soluble iron compound prepared by allowing an iron salt to react with an acidic, organic compound in a process in which a suitable oxidation means ensures that all iron in the final product is present in its highest stable oxidation state at standard conditions; and
(e) at least one polybranched organic/inorganic hybrid polymer comprising an inorganic core carrying organic branches that constitute a particle structure;
characterized in that the $C_8$-$C_{24}$ fatty acid or a $C_8$-$C_{24}$ fatty acid derivative is completely or partially halogenated.

18. Polymer composition as claimed in claim 16, characterized in the $C_8$-$C_{24}$ fatty acid or a $C_8$-$C_{24}$ fatty acid derivative is completely or partially unsaturated.

19. Polymer composition as claimed in claim 16, characterized in that the oxidation agent is hydrogen peroxide or an organic peroxide.

20. Polymer composition comprising:
a) 10-99.99% by weight of at least one polyolefin;
b) up to 50% by weight of a thermoplastic that is not a polyolefin;
c) 0.005-1% by weight of per se known polymer additives;
d) a fat-soluble iron compound prepared by allowing an iron salt to react with an acidic, organic compound in a process in which a suitable oxidation means ensures that all iron in the final product is present in its highest stable oxidation state at standard conditions; and
(e) at least one polybranched organic/inorganic hybrid polymer comprising an inorganic core carrying organic branches that constitute a particle structure;
characterized in that the developed branches in the organic/inorganic hybrid polymer include groups that are derivatives of 2,2,6,6-tetramethylpiperidine.

21. Polymer composition comprising:
a) 10-99.99% by weight of at least one polyolefin;
b) up to 50% by weight of a thermoplastic that is not a polyolefin;
c) 0.005-1% by weight of per se known polymer additives;
d) a fat-soluble iron compound prepared by allowing an iron salt to react with an acidic, organic compound in a process in which a suitable oxidation means ensures that all iron in the final product is present in its highest stable oxidation state at standard conditions; and
(e) at least one polybranched organic/inorganic hybrid polymer comprising an inorganic core carrying organic branches that constitute a particle structure;
characterized in the developed branches in the organic/inorganic hybrid polymer include groups that are derivates of phenol.

22. Polymer compositions as claimed in claim 1, characterized in that the polymer composition has a substantially homogenous structure (compound).

23. Polymer compositions as claimed in claim 1, characterized in that the polymer composition has at least a partially heterogeneous structure.

24. Polymer composition as claimed in claim 23, characterized in that the heterogeneous structure comprises a laminate.

25. Polymer composition as claimed in claim 23, characterized in that the heterogeneous structure comprises at least two layers that separately can be homogenous or heterogeneous.

26. A molecular barrier layer for use with gases and liquids comprising the polymer composition of claim 1, wherein the barrier layer is effective for molecules such as water, $CO_2$, oxygen and hydrocarbons.

27. A flame retardant composition, the composition comprising the polymer composition of claim 1.

28. A barrier layer, the barrier layer comprising a polymer composition positioned between a first layer comprising a polybranched organic/inorganic hybrid polymer and a thermoplastic, wherein the polymer composition comprises;
- a) 10-99.99% by weight of at least one polyolefin;
- b) up to 50% by weight of a thermoplastic that is not a polyolefin;
- c) 0.005-1% by weight of per se known polymer additives;
- d) a fat-soluble iron compound prepared by allowing an iron salt to react with an acidic, organic compound in a process in which a suitable oxidation means ensures that all iron in the final product is present in its highest stable oxidation state at standard conditions; and
- e) at least one polybranched organic/inorganic hybrid polymer comprising an inorganic core carrying organic branches that constitute a particle structure.

29. The polymer composition of claim 1, further comprising at least one polybranched organic/inorganic hybrid polymer comprising an inorganic core carrying organic branches that constitute a particle structure.

* * * * *